April 24, 1951  E. GISONDI  2,550,060
SELF-LOCKING DRIVE FASTENING DEVICE
Filed May 23, 1950
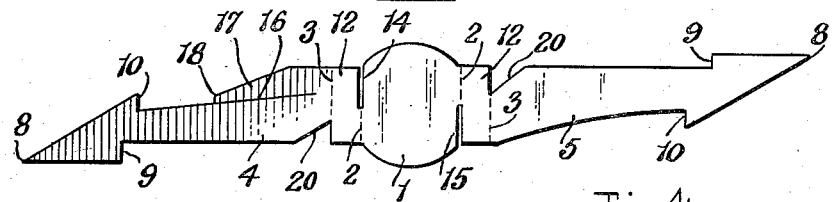
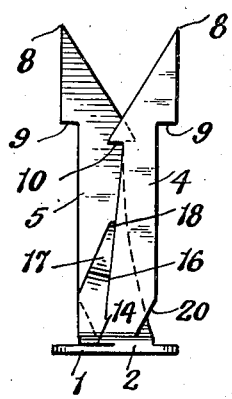
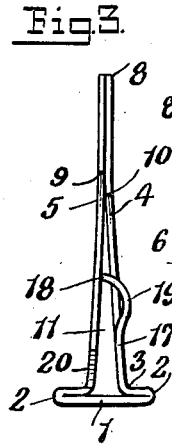
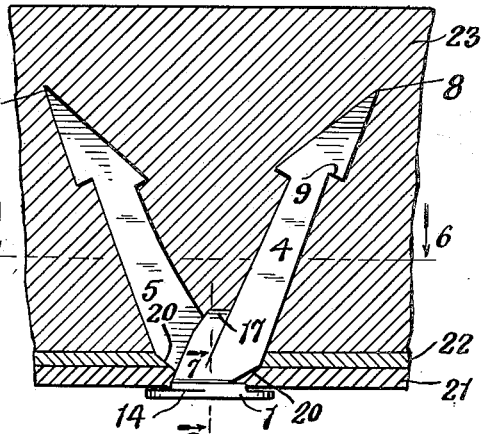
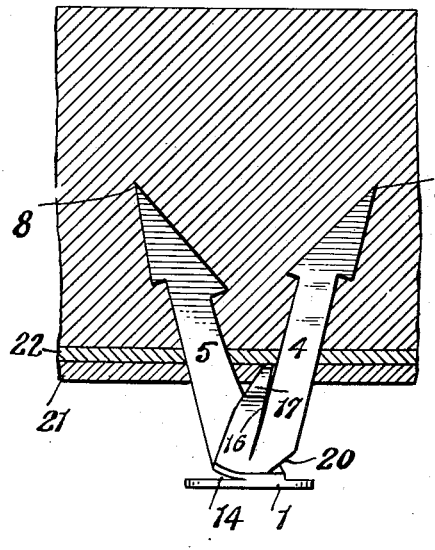
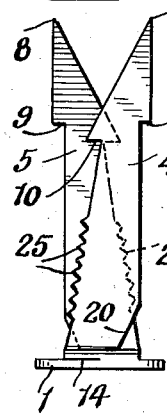
INVENTOR.
Emanuel Gisondi
BY Harry Radzinsky
Attorney Patented Apr. 24, 1951

2,550,060

UNITED STATES PATENT OFFICE 2,550,060

SELF-LOCKING DRIVE FASTENING DEVICE

Emanuel Gisondi, New York, N. Y.

Application May 23, 1950, Serial No. 163,721

4 Claims. (Cl. 85—13)

This invention relates to nails or similar fasteners, and more particularly to fasteners of the type shown and described in my Patent Reissue No. 22,758, dated May 21, 1946. In said patent is shown a nail especially employed for attaching shingles, siding and similar building materials to penetrable siding or under-board, particularly that of readily penetrable material such as, for example, the cane fibre and similar products now widely in use.

More particularly, the invention contemplates the provision of a nail or like fastening element of this character, wholly stamped from a single pipe of sheet metal, whereby it may be stamped out speedily and economically in quantity. One of the objects of the invention is to provide a nail having at least two prongs which spread or "scissor" apart when the nail is driven into the material, and in which means is provided by which a locking effect is attained to prevent the spread prongs or legs of the nail from again coming together, and particularly when a pulling strain is placed on the nail.

The invention also includes the provision of means in the form of a finger, so shaped and disposed, that when the nail is driven into the material, said finger will be bent or curled to an extent sufficient to cause it to enter between the spread prongs or legs of the nail and constitute an abutment preventing the prongs or legs from being again forced in a direction toward one another.

The invention further contemplates the provision of means for tensioning the spread legs of the nail when the nail is driven to its limit into the material, thereby causing the legs to firmly and unchangeably hold their spread or distended position and resist any attempt to dislodge the nail from the material into or through which it is driven.

The invention further contemplates the provision of locking means provided on adjacent edges of two prongs or legs, causing such means to become interengaged when the prongs or legs are spread, thus resisting any return movement of such prongs or legs from spread position.

In my above mentioned patent is shown a nail having two prongs or legs which spread apart when driven into or through material. The present invention relates primarily to means which positively retains such legs or prongs in their spread position, thereby providing a fastener which cannot be pulled out of the material into or through which it is driven without actual destruction of such materials.

In the accompanying drawings, wherein several illustrative embodiments of the invention are disclosed, Fig. 1 is a face view of the sheet metal blank from which one of the improved nails is formed; Fig. 2 is a face view of the finished nail; Fig. 3 is an edge view of the nail, looking at the same from the left side of Fig. 2; Fig. 4 shows the nail driven into the materials which it is intended to fasten together, the nail being very nearly driven home; Fig. 5 shows the nail in the act of being driven into the materials, Fig. 6 is a section view taken on the line 6—6 of Fig. 4, looking in the direction of the arrows; Fig. 7 is a sectional view taken on the line 7—7 of Fig. 4, looking in the direction of the arrows; Fig. 8 is a side view of a modified form of nail, and Fig. 9 shows parts of the nail of Fig. 8 as they appear and interlock when the nail is in its spread condition.

The improved nail is preferably made from sheet metal of non-corrosive nature or else suitably coated to materially retard rust and corrosion. After being stamped out by suitable dies, the blank is bent or folded in a manner to be described, to transform it from the flat blank of Fig. 1 to the finished nail clearly shown in Figs. 2 and 3.

In the blank shown in Fig. 1, a disk-like central portion is indicated at 1 and this forms the head of the nail. In the blank, the two prongs or legs of the nail extend laterally from the head 1, these legs or prongs being indicated respectively at 4 and 5. Each of the legs or prongs is provided with the pointed extremity 8, and also with the barbs 9 and 10. In producing the nail, each prong is bent inwardly on the dotted line 2, and on these lines are slits 14 and 15 extending inwardly from the opposite longitudinal edges of the blank as clearly seen in Fig. 1. When the prongs are bent inwardly on the fold lines 2, the portion of each prong indicated at 12 is then disposed flatly against a face of the disk or head 1. The two prongs 4 and 5 are then bent outwardly on the dotted lines 3, or substantially at right angles to the plane of the disk 1. As will be noted in Fig. 3, the two prongs are not in strict parallelism at their bases, but are separated thereat as indicated by the spacing shown at 11. As the legs or prongs 4 and 5 near the tips or pointed extremities 8, they lie in close contact being held in such contact by the springiness of the metal.

The leg or prong shown at 4 is split as indicated at 16 to thereby provide a locking finger 17 which is curved or bent toward its extremity or free end 18 in the manner indicated at 19 in Fig. 3. This curved disposition of the locking finger 17 causes its free end or tip 18 to lie in contact with the face of the second leg or prong 5 when the nail is in its unused position as in Figs. 2 and 3.

It will be noted that each of the prongs 4 and 5 is provided in one edge adjacent to the point of joinder of the prong to the head portion 1, or at a point which may be said to be the base portion of the prong, with a notch 9. These notches 9 help to facilitate the bending or scissoring action of the prongs when the nail is driven into or through materials.

In Fig. 5 one of the nails is shown being driven through composition or other shingles 21 and 22, and into a base material such as penetrable wall board or the like indicated at 23. In the view of the drawing, the nail has been only partly driven home and it will be noted that as the prongs 4 and 5 are driven into the materials 21, 22 and 23, the prongs tend to buckle or bend not only at the notched points 20, but also at the slots 14, these slots opening up during this spreading action of the prongs, as clearly seen in Fig. 5. The prongs 4 and 5 spread farther apart as the driving of the nail continues, this spreading action of the prongs being facilitated by the shape of the barbed ends of the prongs. When the free end or extremity 18 of the curved locking finger 17 meets resistance as it enters the materials 21, 22 and 23, it will tend to bend over or clench and will form a hooked abutment now positioned between the spread legs or prongs 4 and 5 as shown in Figs. 4 and 5. As further driving movement of the nail is continued, the surfaces of the parts 12 will forcibly contact the outer surface of the material 21, and this will cause the slits 14 to close up and cause a slight closing movement of the prongs 4 and 5 to be started, but only to a limited extent because of the fact that the locking finger 17 has entered between the prongs or legs 4 and 5 and prevents any material closing movement of these prongs. The prongs are thus held firmly in a spread condition and under tension in such spread position substantially as shown in Fig. 4, in which the nail is shown as having been driven nearly home.

It is obvious that when the nail has been driven in, in the manner described and the spread legs or prongs maintained in such spread position and prevented from being again brought together because of the abutment in the form of the locking finger 17 having entered between them, the nail cannot be drawn out without either actually destroying it or the materials through which it has been driven. Neither will it become loosened by vibration or from other causes and will constitute a permanent and extremely secure fastener.

The prongs or legs 4 and 5 are normally slightly under spring pressure, and as they spread apart, they tend to cross one another or assume angular positions, as will be noted in Fig. 6. This not only assumes a good locking action in the materials, but facilitates the definite entry of the locking finger 17 between the prongs when the prongs are spread apart.

In the embodiment of the invention shown in Figs. 8 and 9, I take advantage of this tendency of the two prongs or legs to assume angular positions as they spread, for in this embodiment of the invention I provide one edge of each of the prongs with serrations or teeth 25. When the two prongs spread and assume angular positions relative to one another, these toothed sections 25 on the two prongs will cross one another, and any attempt to cause the two prongs 4 and 5 to move toward closing position or in a direction toward one another will be prevented by the engagement or interlock of the two sets of teeth.

It will be apparent from the foregoing that I have provided a nail in which a spreading action is automatically attained when the nail is driven into the materials which it is to fasten, and in which such spreading action, when once attained, is permanently retained by means of elements either entering between the legs or prongs or engaging between the prongs and preventing any closing movement of the prongs.

I have herein described my improved nail as being particularly useful in connection with the fastening of building materials, but it will be apparent that it has many uses, particularly where a permanent fastening is desired and one in which the materials fastened are likely to give way before the fastening member will. Also, I have herein shown the prongs of the fastener as entering the materials and not extending completely through the same. It will be apparent that the nails may be used in any environment in which the nail only partly penetrates the materials or one in which a complete penetration is attained, the simple requirement being that the materials in which the nail is used shall be those in which the nail can be inserted and driven in by hammer blows in the known manner of conventional types of nails.

What I claim is:

1. A sheet metal nail having a head, a pair of of flat prongs in partly overlapped substantially parallel relation, the overlapping edges of said prongs diverging at their free end portions to cause spreading apart of the prongs when the nail is driven into materials, one of said overlapping edges being provided with an element secured to the associated prong adjacent said head and extending alongside said prong, said element being provided with means to bend said element between said prongs when same are spread apart in application of said nail to prevent closing movement of the prongs in a direction toward one another.

2. A sheet metal nail as in claim 1 wherein the bases of the prongs adjacent their connection with the head are respectively slit inwardly from opposite sides to facilitate the spreading apart of the prongs.

3. A sheet metal nail as in claim 1, wherein the prongs are slightly spaced from each other adjacent said head and said element comprises a finger tapering towards its outer end with the free end of the finger bent out of the plane of the carrying prong towards the other prong.

4. A sheet metal nail as in claim 1, wherein the prongs are slightly spaced from each other adjacent said head and said element comprises a finger tapering toward its outer end with the free end of the finger bent out of the plane of the carrying prong towards the other prong, the bases of the fingers adjacent their connections with the head being respectively slit inwardly from opposite side edges to facilitate the spreading-apart of the prongs.

EMANUEL GISONDI.

REFERENCES CITED

The following references are of record in the file of this patent:

UNITED STATES PATENTS

| Number | Name | Date |
|---|---|---|
| Re. 22,758 | Gisondi | May 21, 1946 |
| 1,282,333 | Walberg | Oct. 22, 1918 |
| 2,429,113 | Warner | Oct. 14, 1947 |